US009641023B2

(12) United States Patent
Zhou et al.

(10) Patent No.: US 9,641,023 B2
(45) Date of Patent: May 2, 2017

(54) STANDBY POWER SUPPLY CIRCUIT FOR 2-WIRE BUS INTERCOM SYSTEM AND APPARATUS THEREOF

(75) Inventors: Dalin Zhou, Fujian (CN); Yangpeng Zhang, Fujian (CN); Mingyuan Liu, Fujian (CN); Huaping Li, Fujian (CN); Zhitian Ye, Fujian (CN)

(73) Assignee: ABB Schweiz AG (CH)

( * ) Notice: Subject to any disclaimer, the term of this patent is extended or adjusted under 35 U.S.C. 154(b) by 484 days.

(21) Appl. No.: 14/348,085

(22) PCT Filed: Apr. 16, 2012

(86) PCT No.: PCT/CN2012/074136
§ 371 (c)(1),
(2), (4) Date: Mar. 28, 2014

(87) PCT Pub. No.: WO2013/155670
PCT Pub. Date: Oct. 24, 2013

(65) Prior Publication Data
US 2014/0252861 A1    Sep. 11, 2014

(51) Int. Cl.
*H02J 9/00*      (2006.01)
*H04M 19/00*    (2006.01)
(Continued)

(52) U.S. Cl.
CPC ............ *H02J 9/005* (2013.01); *G05F 1/46* (2013.01); *H02J 4/00* (2013.01); *H04M 19/00* (2013.01); *Y10T 307/615* (2015.04)

(58) Field of Classification Search
CPC ...... H02J 4/00; H02J 9/00; H02J 9/005; H02J 9/061; Y10T 307/615; H04M 19/00; G05F 1/46; G05F 1/56; G05F 1/625
See application file for complete search history.

(56) References Cited

U.S. PATENT DOCUMENTS 9,032,228 B2 * 5/2015 Kim .................... G06F 1/26
                                                           363/81
2002/0080628 A1    6/2002  L'Hermite
(Continued)

FOREIGN PATENT DOCUMENTS

| CN | 2697948 Y | 5/2005 |
| CN | 102076144 A | 5/2011 |
| JP | 2087753 A | 3/1990 |

OTHER PUBLICATIONS

ISA/CN International Search Report issued Jan. 24, 2013 re PCT Application No. PCT/CN2012/074136, filed Apr. 16, 2012.
(Continued)

*Primary Examiner* — Ryan Johnson
(74) *Attorney, Agent, or Firm* — Taft Stettinius & Hollister LLP (57) ABSTRACT

The present invention discloses a standby power supply circuit for a 2-wire bus intercom system and an apparatus thereof. The standby power supply circuit is separated into two power supply modules; in which the first power supply module is a power supply to standby circuit and the second power supply module is a power supply to operation circuit; said power supply to operation circuit is switched off by a constant current switch when the device load is at the standby status; and said power supply to standby circuit comprises a constant current circuit whose alternating current impedance is very large. The solutions of the present invention achieve larger alternating current impedance for the 2-wire intercom system, which can offer sufficient power for many device loads both in the conditions of operation and standby statuses.

19 Claims, 6 Drawing Sheets (51) Int. Cl.
*G05F 1/46* (2006.01)
*H02J 4/00* (2006.01)

(56) References Cited

U.S. PATENT DOCUMENTS

2003/0011247 A1* 1/2003 Kajiwara ................ G06F 1/263
307/125
2015/0067370 A1* 3/2015 Hung ...................... H02J 9/005
713/323

OTHER PUBLICATIONS

Extended European Search Report issued Apr. 22, 2015 re EP Application No. 12874565.0 of ABB Technology Ltd.
Canadian Office Action issued Jul. 29, 2015 re CA Application No. 2,849,807 of ABB Technology Ltd.
Chinese Office Action issued Sep. 30, 2015 re CN Application No. 201280045497.8 of ABB Technology Ltd.

\* cited by examiner

STANDBY POWER SUPPLY CIRCUIT FOR 2-WIRE BUS INTERCOM SYSTEM AND APPARATUS THEREOF

RELATED APPLICATION

This application is a national filing of PCT application Serial No. PCT/CN2012/074136, filed Apr. 16, 2012.

FIELD OF THE INVENTION

The invention relates to the intercom system technical field, and more particularly to a standby power supply circuit for a 2-wire bus intercom system and an apparatus thereof.

BACKGROUND OF THE INVENTION

Figure 1:
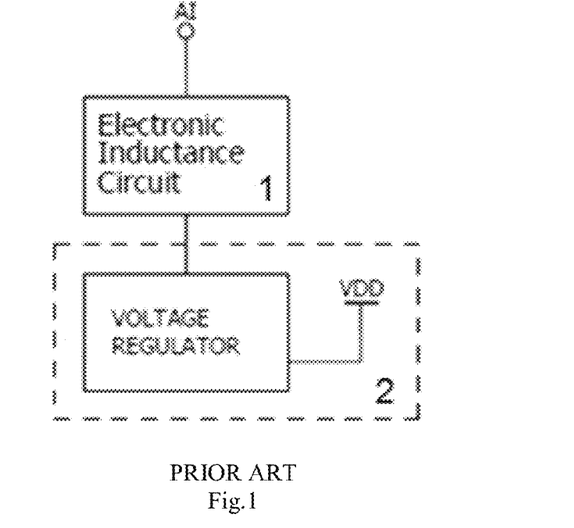
FIG. 1 illustrates a circuit diagram of a power supply circuit for a 2-wire bus intercom system according to the prior art.
Figure 2A:
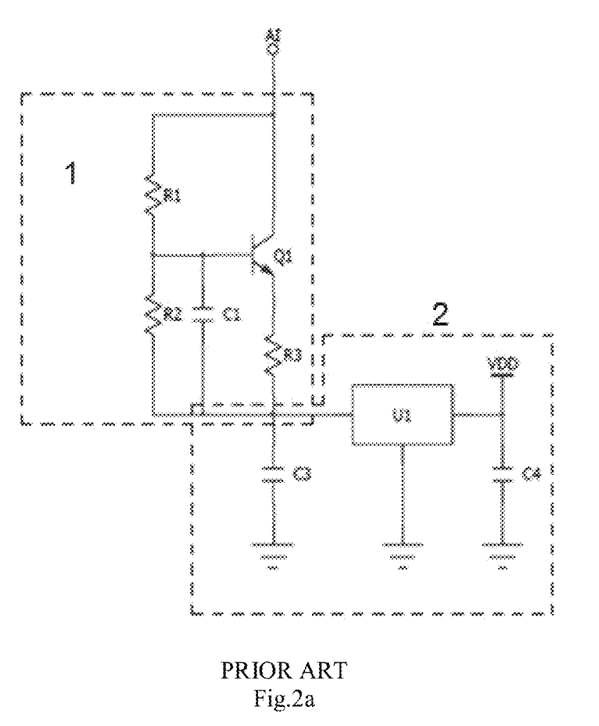
FIGS. 2a-2d individually illustrate a circuit diagram of 4 conventional power supply circuits for a 2-wire bus intercom system according to the prior art.
Figure 2B:
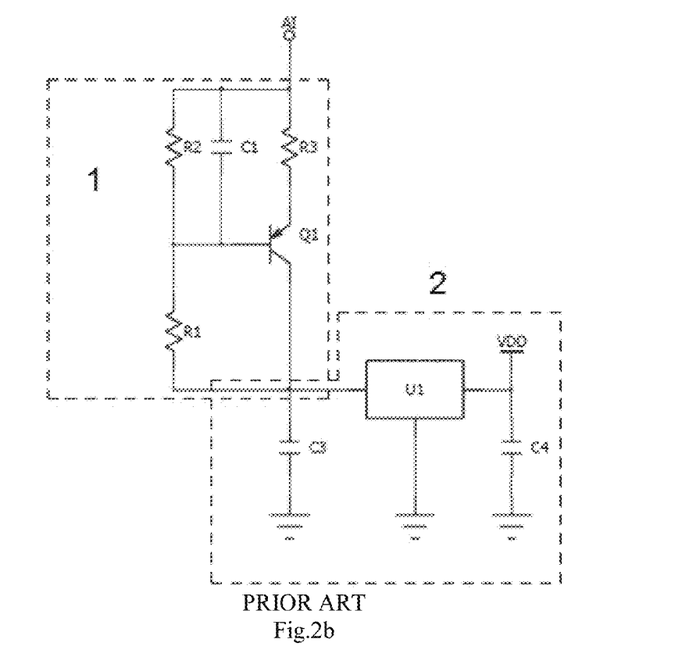
Figure 2C:
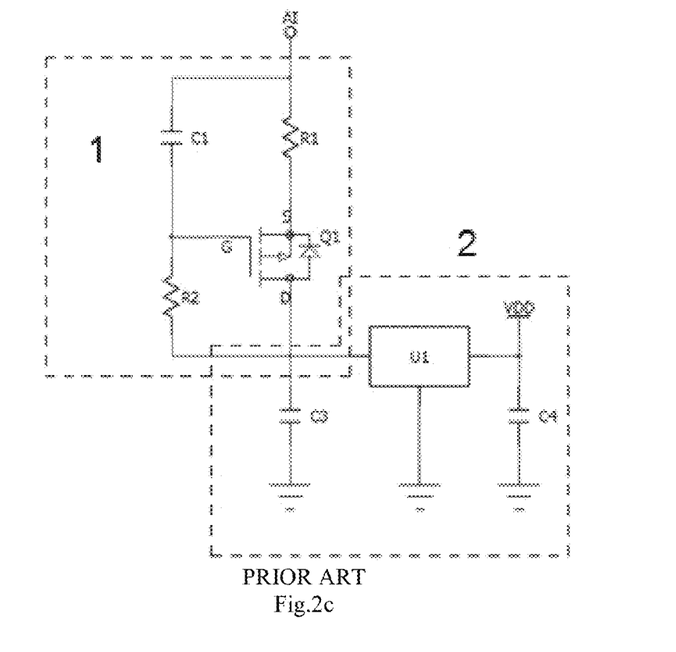
Figure 2D:
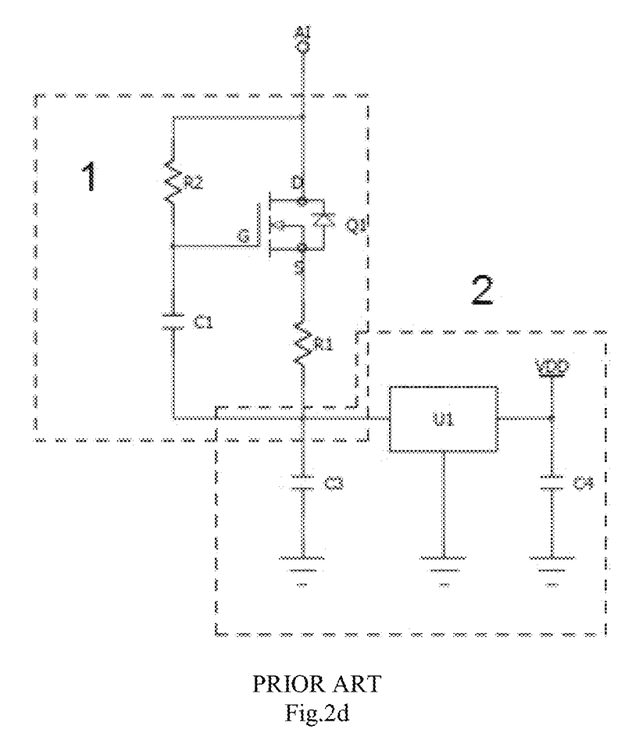

In order to implement a 2-wire video intercom system, the direct current power, the video carrier signal, the audio signal and the command data signal have to be transmitted on a common 2-wire bus simultaneously. Therefore, the power supply circuits of the system power supply and devices thereof have to comprise an inductance component connected to the common bus in series, which allows the direct current passing whilst also suppresses the alternating current signal. However, it is common sense to the skilled person in art that the audio signal frequency is low to 300 Hz if a coil inductor is used as the inductance component. In order to achieve the sufficient impedance and power supply capacity as well, the size of such inductor shall become very large. FIG. 1 illustrates a circuit diagram of a power supply circuit for a 2-wire bus intercom system according to the prior art. As shown in FIG. 1, an electronic inductance circuit can be usually used to replace the coil inductor to reduce its size. In detail, FIGS. 2a-2d individually illustrate a circuit diagram of 4 conventional power supply circuits for a 2-wire bus intercom system according to the prior art. However, there is only one system power supply for a 2-wire intercom system in a building; hence, even for a large 2-wire intercom system with large numbers of device loads, it only allows a very small number of devices at operating status whilst the absolute majority of the device loads have to be at standby status.

As above described, the conventional power supply circuits for a 2-wire intercom system are consisted of an electronic inductance circuit and a voltage regulator circuit, which offer power to both standby circuits and operation circuits. While the alternating current impedance of an electronic inductance circuit is limited, especially a large current power supply with an electronic inductance circuit for an operation circuit. However, all the device loads of a 2-wire intercom system are connected to the common bus in series, which means the alternating current impedance of n device loads is 1/n of one device load. When the quantity of device loads is large, the alternating current impedance will become insufficient, the size of 2-wire intercom system will be limited and the audio quality of such 2-wire intercom system will become much worse.

Consequently, existing solutions including the prior art mentioned above can't achieve a higher alternating current impedance at the standby status when the 2-wire bus intercom system is connected with large amount of device loads. Due to the above mentioned problems, the present invention is to propose a standby power supply circuit for a 2-wire bus intercom system and an apparatus thereof.

SUMMARY OF THE INVENTION

The main object of the present invention is to provide a power supply circuit with sufficiently large alternating current impedance for 2-wire bus intercom system even at standby status. Hence, the present invention provides a standby power supply circuit for a 2-wire bus intercom system and an apparatus thereof.

According to an aspect of the present invention, it provides a standby power supply circuit for a 2-wire bus intercom system. The standby power supply circuit is separated into two power supply modules; in which the first power supply module is a power supply to standby circuit and the second power supply module is a power supply to operation circuit; the power supply to operation circuit is switched off by a constant current switch when the device load is at the standby status; and the power supply to standby circuit comprises a constant current circuit whose alternating current impedance is very large.

According to another preferred embodiment of the present invention, the power supply to standby circuit further comprises a constant current circuit connected between the input terminal and a standby regulator circuit.

According to another preferred embodiment of the present invention, the constant current circuit further comprises a main constant current circuit and an auxiliary constant current circuit, in which the main constant current circuit is configured to make the current through the main constant current path stable; and the auxiliary constant current circuit is configured to offer an enough bias current for the main constant current circuit under a rather lower bias voltage and maintain an rather larger AC.

According to another preferred embodiment of the present invention, main constant current circuit further comprises a main constant current path and a voltage regulator unit, in which the voltage regulator unit is configured to make the voltage stable whatever the temperature or current fluctuates and make the alternating current impedance of the main current path very high.

According to another preferred embodiment of the present invention, main constant current path is along a first transistor and a first resistor; in which the collector of the first transistor is connected to the input terminal and the emitter of the first transistor is connected with the first resistor in series.

According to another preferred embodiment of the present invention, voltage regulator unit further comprises: a diode and a first Zener diode conversely connected in series, a second resistor and a first capacitor connected in series; and the diode and the first Zener diode connected with the second resistor and the first capacitor in parallel.

According to another preferred embodiment of the present invention, the standby regulator circuit further comprises a set of resistors consisted of a third resistor and a fourth resistor connected in series, a second Zener diode and a second capacitor; and the set of resistors, the second Zener diode and the second capacitor are connected in parallel and grounded.

According to another preferred embodiment of the present invention, the voltage regulator unit further comprises a first capacitor and a first Zener diode connected in parallel.

According to another preferred embodiment of the present invention, the standby regulator circuit further comprises a second Zener diode and a second capacitor connected in parallel and grounded.

According to another preferred embodiment of the present invention, the auxiliary constant current circuit comprises a control current path and a second control current path, in which the control current path is along a second transistor and a fifth resistor; the second control current path is along a third resistor and a sixth transistor; the fifth resistor is connected to the base and the emitter of the third transistor in parallel; and the sixth resistor is connected to the collector and the base of the second transistor in parallel.

According to another preferred embodiment of the present invention, the auxiliary constant current circuit further comprises a third capacitor connected to the collector and the emitter of the third transistor in parallel.

According to another preferred embodiment of the present invention, the standby power supply circuit further comprises a MCU, configured to control the constant current switch to be switched on/off.

According to another preferred embodiment of the present invention, the power supply to operation circuit further comprises an electronic inductance circuit and a second voltage regulator circuit.

According to another preferred embodiment of the present invention, the constant current switch is connected between the power supply to standby circuit and the power supply to operation circuit, configured to switch off by the power supply to operation circuit when the device load is at the standby status.

According to another preferred embodiment of the present invention, the constant current switch further comprises at least two transistors, three resistor and a fourth capacitor, in which the seventh resistor is connected to the emitter and the base of the fourth transistor in parallel; the base of the fourth transistor is connected to the collector of the fifth transistor; the eighth resistor is connected between the emitter of the fifth transistor and the ground; and the fourth capacitor is connected between the base of the fifth transistor and the ground.

According to another preferred embodiment of the present invention, the collector of the fourth transistor is connected to the electronic inductance circuit; and the ninth resistor is connected to the base of the fifth transistor and a MCU.

According to another preferred embodiment of the present invention, the electronic inductance circuit comprises: a main circuit path along an inductor and a source terminal and a drain terminal of a FET between the input terminal and the output terminal of the electronic inductance circuit, in which the inductor is connected to the source terminal of the FET; a resistor and a freewheeling diode individually connected to the inductor in parallel; and a secondary circuit path along a capacitor connected with a second resistor in series between the input terminal and the output terminal, which is connected to the main circuit path in parallel.

According to another preferred embodiment of the present invention, the inductor and the FET are connected in series, and the node between the capacitor and the second resistor is connected with the gate terminal of the FET.

According to another preferred embodiment of the present invention, the FET is a P-channel FET, and the drain terminal of the P-channel FET is connected to the output terminal; and the inductor is connected between the input terminal and the source terminal of the P-channel FET.

According to another preferred embodiment of the present invention, the FET is an N-channel FET, and the source terminal of the N-channel FET is connected to the input terminal; and the inductor is connected between the source terminal of the N-channel FET and the output terminal.

According to another aspect of the present invention, it provides an apparatus for a 2-wire bus intercom system. The apparatus comprises any one of the standby power supply circuits above mentioned.

Embodiments of the present invention provide a standby power supply circuit for a 2-wire bus intercom system and an apparatus thereof, which achieves larger alternating current impedance at standby status and high audio quality for a 2-wire bus intercom system.

BRIEF DESCRIPTION OF THE DRAWINGS

The subject matter of the invention will be explained in more details in the following description with reference to preferred exemplary embodiments which are illustrated in the drawings, in which.

DETAILED DESCRIPTION OF PREFERRED EMBODIMENTS

Exemplary embodiments of the present invention are described in conjunction with the accompanying drawings hereinafter. For the sake of clarity and conciseness, not all the features of actual implementations are described in the specification.

Figure 3:
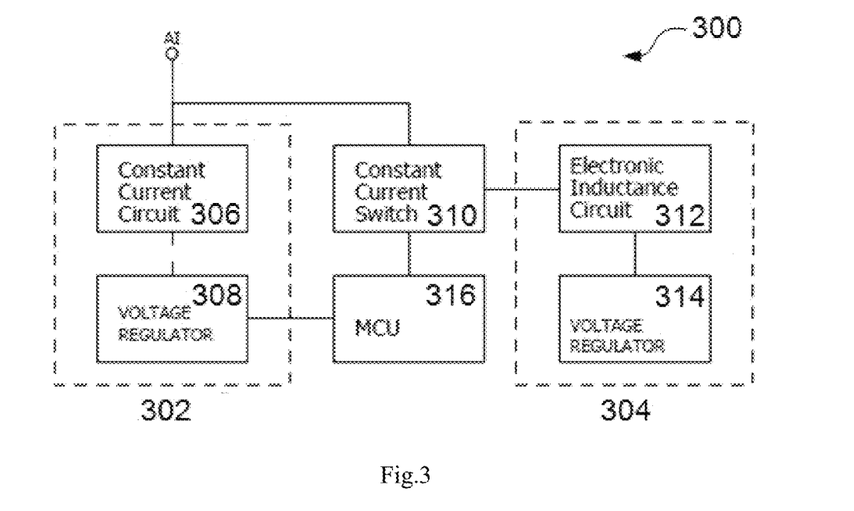
FIG. 3 illustrates a circuit diagram of a standby power supply circuit for a 2-wire bus intercom system according to a preferred embodiment of the present invention.

FIG. 3 illustrates a circuit diagram of a standby power supply circuit for a 2-wire bus intercom system according to a preferred embodiment of the present invention.

As shown in FIG. 3, the standby power supply circuit 300 for a 2-wire intercom system of the present invention is separated into two power supply modules: a power supply to standby circuit 302 and a power supply to operation circuit 304, the power supply to standby circuit 302 comprises a constant current circuit 306 connected between the input terminal AI and a standby regulator circuit 308. The constant current switch 310 is connected between the power supply to standby circuit 302 and the power supply to operation circuit 304 and configured to switch off by the power supply to operation circuit 304 when the device load is at the standby status.

As the operation power supply circuit 304 is switched off when the device load is at standby status, the number of this circuit 304 connected to the system common bus simultaneously is very small. The alternating impedance of the electronic inductance circuit 310 is not very large, but the alternating current impedance affection on this circuit 304 is less.

The power supply to operation circuit 304 comprises an electronic inductance circuit 312 and a second voltage regulator circuit 314. It's obvious to the person skilled in art that electronic inductance circuit 312 and the second voltage regulator circuit 314 can be any available electronic inductance circuits and voltage regulator circuits according to the prior art.

According to a preferred embodiment of the present invention, the standby power supply circuit 300 further comprises a MCU 316 which is configured to instruct and control the constant current switch 310 to be switched on/off.

Figure 4:
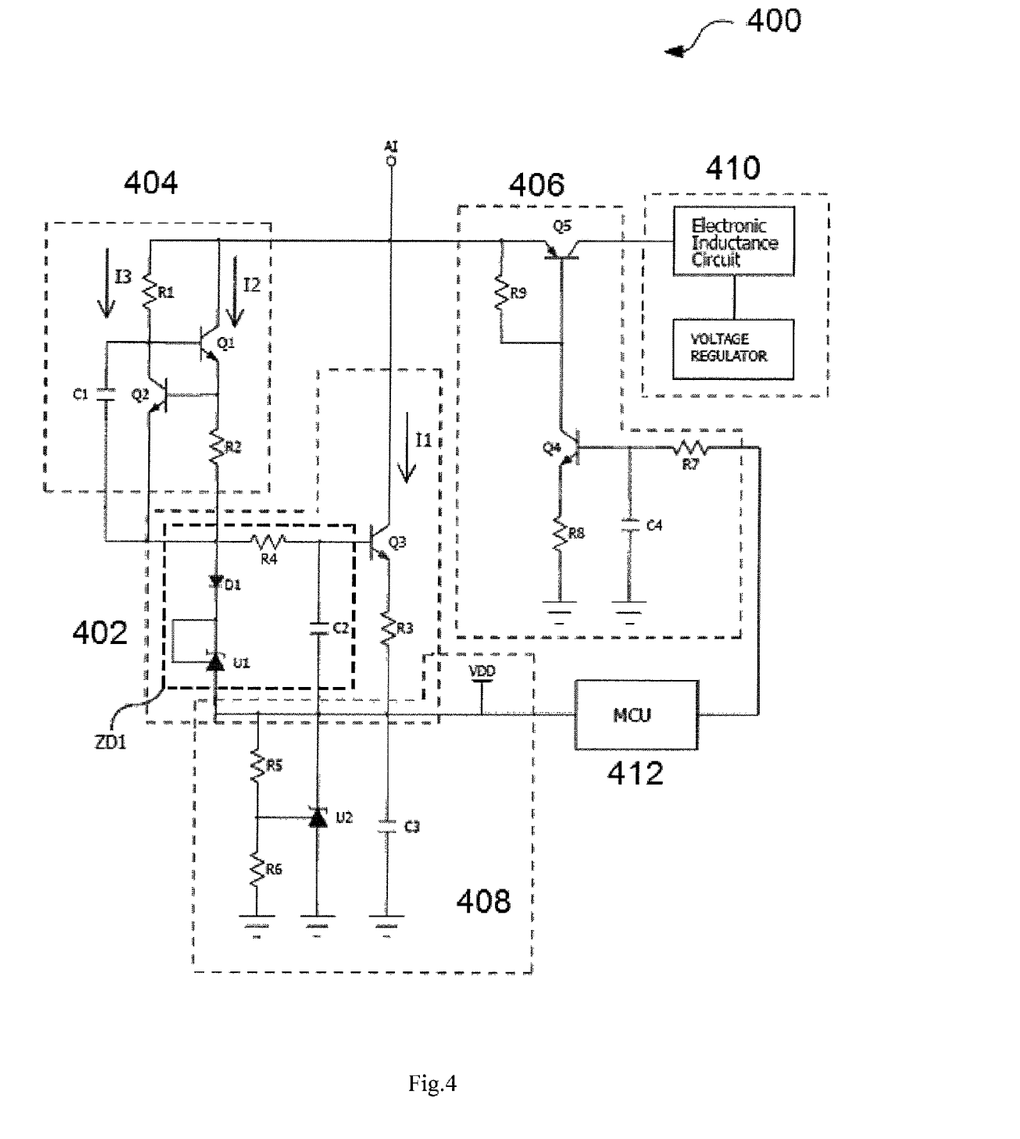
FIG. 4 illustrates a standby power supply circuit for a 2-wire bus intercom system according to a preferred embodiment of the present invention.

FIG. 4 illustrates a standby power supply circuit for a 2-wire bus intercom system according to a preferred embodiment of the present invention.

As shown in FIG. 4, the standby power supply circuit 400 comprises a main constant current circuit 402, an auxiliary constant current circuit 404, a constant current switch 406, a standby regulator circuit 408 and a power supply to operation circuit 410. Especially the constant current circuit 306 in FIG. 3 further comprises a main constant current circuit 402 and an auxiliary constant current circuit 404, in which the main constant current circuit is 402 configured to make the main constant current I1 through said main constant current path stable; and the auxiliary constant current circuit 404 is configured to offer an enough bias current for the main constant current circuit under a rather lower bias voltage (e.g. 5-10V), furthermore, to maintain an rather larger AC impedance (e.g. about 100 kΩ). In an actual embodiment, the desired AC impedance of the whole constant current circuit is about 80 kΩ, if the auxiliary constant current circuit is directly replaced by a 80 kΩ resistor, a bias voltage more than 100V shall be utilized to offer a 1 mA current for constant bias circuit.

In detail, the main constant current circuit 402 further comprises a main constant current path and a voltage regulator unit configured to make the voltage stable whatever the temperature or current fluctuates and make the alternating current impedance of said main current path very high; in which the main constant current path is along a transistor Q3 and a resistor R3, moreover the collector of the transistor Q3 is connected to the input terminal AI and the emitter of the transistor Q3 is connected with the resistor R3 in series.

As to voltage regulator unit, it further comprises a diode D1 and a Zener diode U1 or a similar device (e.g. a TL431) conversely connected in series, a resistor R4 and a capacitor C2 connected in series; and the diode D1 and the Zener diode U1 connected with the resistor R4 and the capacitor C2 in parallel between the auxiliary constant current circuit 404 and the standby regulator circuit 408.

The auxiliary constant current circuit 404 comprises a control current path and a second control current path, in which the control current path is along a the NPN transistor Q1 and a resistor R2, the second control current path is along a resistor R1 and a NPN transistor Q2, the resistor R2 is connected to the base and the emitter of the transistor Q2 in parallel, the resistor R1 is connected to the collector and the base of the transistor Q1 in parallel and the base of the transistor Q1 is connected to the collector of the transistor Q2 whilst the base of the transistor Q2 is connected to the emitter of the transistor Q1. Furthermore, a capacitor C1 is connected to the collector and the emitter of the transistor Q2 in parallel.

The constant current switch 406 is connected between the auxiliary constant current circuit 404 and the power supply to operation circuit 410, and configured to switch off by said power supply to operation circuit when the device load is at the standby status. In detail, the constant current switch 406 further comprises at least two transistors, three resistor and a fourth capacitor, in which the resistor R9 is connected to the emitter and the base of the PNP transistor Q5 in parallel; the base of the transistor Q5 is connected to the collector of the NPN transistor Q4; the resistor R8 is connected between the emitter of the transistor Q4 and the ground; and the capacitor C4 is connected between the base of the transistor Q4 and the ground.

It's optimal that the constant current switch 406 is connected to MCU 412 via a resistor R7.

The standby regulator circuit 408 further comprises a set of resistors consisted of a resistor R5 and another resistor R6 connected in series, a Zener diode U2 (e.g. a TL431) and a capacitor C3; and the set of resistors R5 and R6, the Zener diode U2 and the capacitor C3 are connected to the main constant current circuit 402 in parallel and grounded.

Taking the embodiment shown in FIG. 3 as an example, the standby power supply circuit of the present invention is structured by a main constant current circuit and an auxiliary constant current circuit; wherein the main constant current circuit has a voltage regulator unit ZD1, whose voltage is stable even as the temperature or current fluctuates. Hence, the current I1 via the main constant current path will be stable and the alternating current impedance of main current path is very high. Because the main constant current I1 is not very small and the voltage regulator unit ZD1 also needs a sufficient current to ensure the voltage stability, so the control current I2 has to be sufficiently large. If the control current I2 is supplied by a resistor from the input terminal AI, the resistance of such resistor will be not very large; so the alternating current impedance of the whole constant current will be not very large. For the constant current circuit of the present invention, the control current of the main constant current is supplied by an auxiliary constant current circuit I2. As the current I2 is far smaller than I1, and the auxiliary constant current circuit is structured by two transistors back to back, so the control current I3 can be very small and the resistance of R1 can be very large, therefore the alternating current impedance of the whole constant current can be kept very large.

Figure 5:
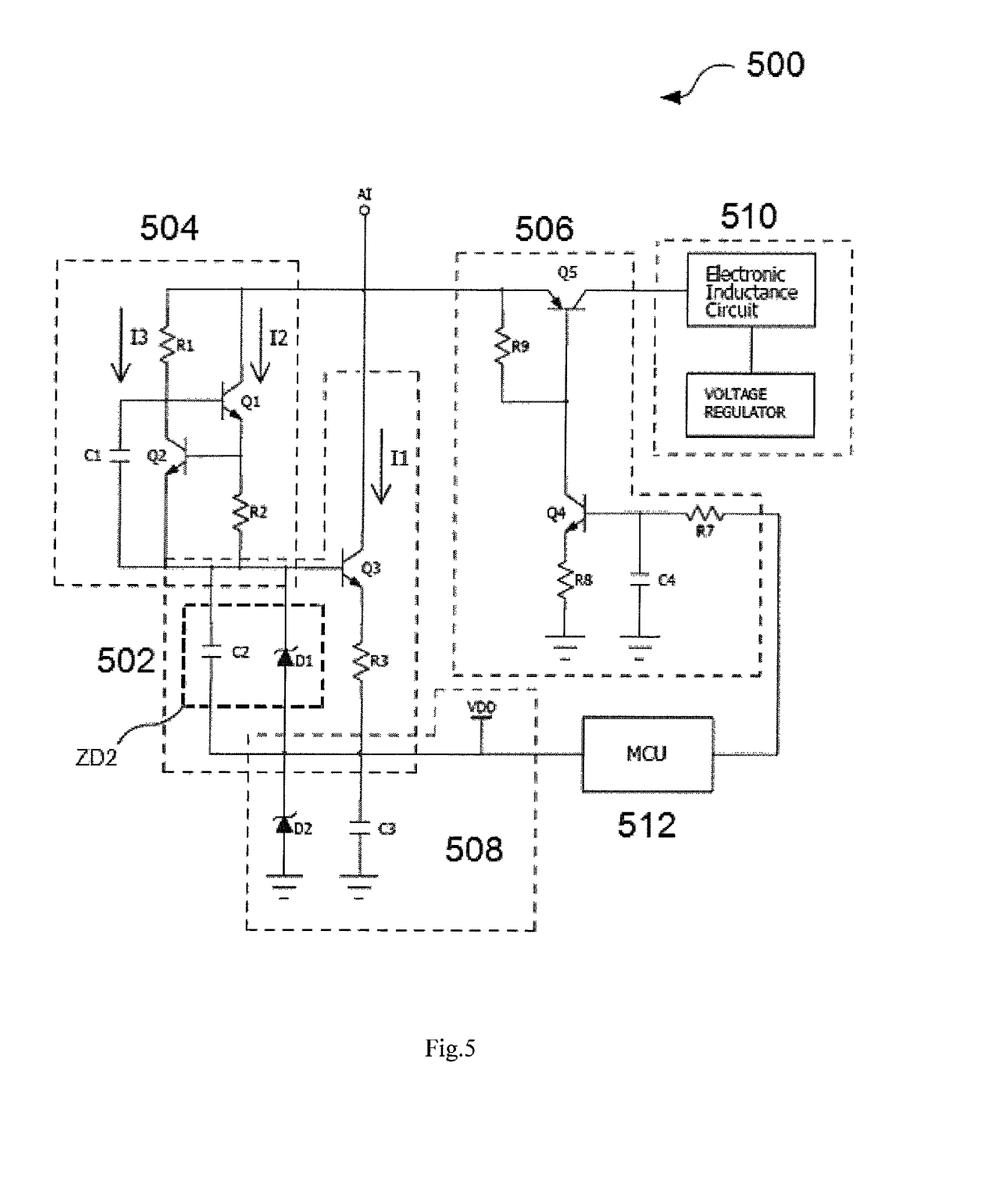
FIG. 5 illustrates a standby power supply circuit for a 2-wire bus intercom system according to another preferred embodiment of the present invention.

FIG. 5 illustrates a standby power supply circuit for a 2-wire bus intercom system according to another preferred embodiment of the present invention.

As shown in FIG. 5, the standby power supply circuit 500 also comprises a main constant current circuit 502, an auxiliary constant current circuit 504, a constant current switch 506, a standby regulator circuit 508, a power supply to operation circuit 510 and a MCU 512; in which the auxiliary constant current circuit 504, the constant current switch 506, the standby regulator circuit 508, the power supply to operation circuit 510 and the MCU 512 can be same or similar to the auxiliary constant current circuit 404, the constant current switch 406, the standby regulator circuit 408, the power supply to operation circuit 410 and the MCU 412 of FIG. 4. In order to keep the description brief, the same or similar circuits or components will not be described any more.

The main constant current circuit 502 comprises a main constant current path and a voltage regulator unit, in which the main constant current path is same or similar to the one in FIG. 4, the voltage regulator unit ZD2 is configured to make the voltage stable whatever the temperature or current fluctuates and make the alternating current impedance of the main current path very high.

The voltage regulator unit ZD2 further comprises a capacitor C2 and a Zener diode D1 connected in parallel between the auxiliary constant current circuit 504 and the standby regulator circuit 508.

The standby regulator circuit 508 further comprises a Zener diode D2 and a capacitor C3 connected to the main constant current circuit 502 in parallel and grounded.

It's obvious to the person skilled in art that, the electronic inductance circuit can be a general one or the specific one described as following.

Figure 6:
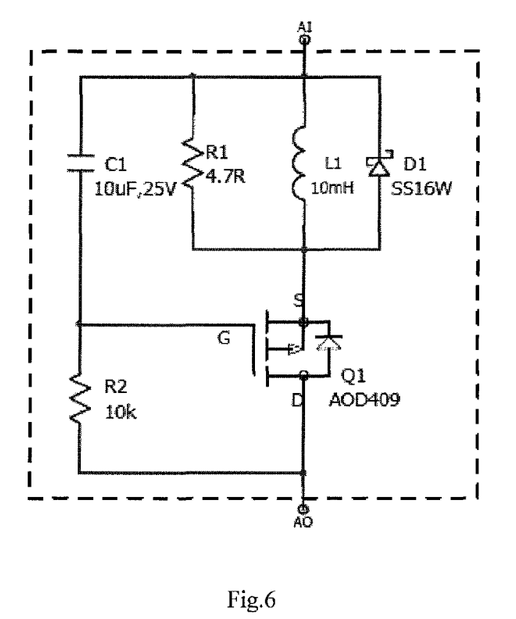
FIG. 6 illustrates a circuit diagram of a kind of the electronic inductance circuit with a P-channel FET for the power supply of a 2-wire bus intercom system according to a preferred embodiment of the present invention.

FIG. 6 illustrates a circuit diagram of a kind of the electronic inductance circuit with a P-channel FET for the power supply of a 2-wire bus intercom system according to a preferred embodiment of the present invention.

As shown in FIG. 6, the electronic inductance circuit EL2 comprises a capacitor C1, a resistor R1, a coil inductor L1, a freewheeling diode D1, a second resistor R2, a P-channel FET Q1 and a second diode. In detail, a main circuit path between the input terminal AI and the output terminal AO of the electronic inductance circuit is along the inductor L1 and the source terminal as well as the drain terminal of the P-channel FET Q1, and the inductor L1 and the FET Q1 are connected in series. Furthermore, the inductor L1 is connected between AI terminal and the source terminal of the FET Q1, both the resistor R1 and the freewheeling diode D1 are individually connected to the inductor L1 in parallel, the drain terminal of said P-channel FET Q1 is connected to the output terminal, and the connection node B1 between the capacitor C1 and the second resistor R2 is connected to the Gate terminal of the P-channel FET Q1. The electronic inductance circuit further comprises a second diode connected to said source terminal and said drain terminal of said FET in parallel. Such second diode is a general diode embedded in the MOSFET, configured to prevent the $V_{DS}$ from over-voltage.

Taking the embodiment of FIG. 6 as an example, R1 is a key factor of the AC impedance of the circuit and can be set as about 4.7Ω. In an actual embodiment, the AC impedance of the circuit is up to about 2 kΩ. As to the capacitor L1, it shall be chosen to make the AC impedance $ZL=2*\pi*f*L$ far larger than 4.7Ω under the 300~3400 Hz frequency. For the inductor C1, the value shall be able to ensure about 300 Hz of the filter cutoff frequency. When connecting AI to a regulated DC power supply and AO to a device load (i.e. a current load), the voltage across the capacitor C1 can't be changed transiently. I.e., $U_{C1}=0$, $U_{GS}=0$, and Q1 is still turned off. The voltage of AO will be dropped to the reference GND by device load that $U_{AI}-U_{AO}=U_{AI}=U_{R2}$, so the capacitor C1 will be charged by the resistor R2. When the voltage across C1 is larger than the gate threshold voltage of the FET Q1, the Q1 starts to be turned on. When the current I1 reaches the required current value of the device load, the charging of the capacitor C1 will be stopped and $U_{GD}=0$, therefore, the voltage drop of electronic inductance EL2 is $U_{EL2}=U_{AI}-U_{AO}=U_{Z1}+U_{SG}$.

As the DC resistance value of the coil inductor L1 is far less than the auxiliary resistor R1, so the AC impedance of Z1 is mainly determined by the coil inductor L1 that $Z1=R_{L1}//R1 \approx R_{L1}$; therefore, the voltage drop of the electronic inductance EL2 is represented by equation (1) as below:

$$U_{EL2}=U_{AI}-U_{AO}=I1*R_{L1}+U_{SG} \qquad (1)$$

Wherein the DC resistance value of the coil inductor is sufficiently small in comparison to the resistance value of the resistor R1 that $Z1=R_{L1}//R1 \approx R_{L1}$.

Next, as to the alternating current impedance of the electronic inductance EL2, if a fluctuation voltage ΔU occurs at the terminal of AO, then the fluctuation voltage across C1 is $\Delta U_{C1}=\Delta U*Z_{C1}/(R2+Z_{C1})$. Meanwhile $\Delta U_{C1}=\Delta U_{SG}+\Delta U_{R1})=\Delta I1/gm+\Delta I1*Z1$, so $\Delta U*Z_{C1}/(R2+Z_{C1})=\Delta I1/gm+\Delta I1*Z1$; therefore $R1+Z_{Q1}=\Delta U/\Delta I1=(1+Z1*gm)*(R2+Z_{C1})/(Z_{C1}*gm)=\{(1+Z1*gm)/gm\}*\{(R2+Z_{C1})/Z_{C1}\}$ As the alternating current impedance value of coil inductor L1 is much large than auxiliary resistor, so the alternating current impedance of Z1 is determined by the auxiliary resistor R1 that $Z1=R_{L1}//R1 \approx R1$, so $R1+Z_{Q1}=\Delta U/\Delta I1=(1+Z1*gm)*(R2+Z_{C1})/(Z_{C1}*gm) \approx \{(1+R1*gm)/gm\}*\{(R2+Z_{C1})/Z_{C1}\}$ Therefore, the alternating current impedance $Z_{EL2}$ between the terminals AI and AO is represented by equation (2) as below:

$$\begin{aligned} Z_{EL2} &= (R1+Z_{Q1}) // (R2+Z_{C1}) \qquad (2) \\ &= \{(1+Z1*gm)/gm\}*\{(R2+Z_{C1})/Z_{C1}\} // (R2+Z_{C1}) \\ &\approx \{(1+R1*gm)/gm\}*\{(R2+Z_{C1})/Z_{C1}\} // (R2+Z_{C1}) \end{aligned}$$

Wherein, $Z_{C1}=1/(j*\Omega*C1)=1/(j*2*\pi*f)$ and "gm" represents the trans-conductance of the FET.

When the electronic inductance circuit EL2 allows DC passing, it is preferable to make the voltage drop $U_{EL2}$ represented by the equation (1) small and DC respond quickly. On the other hand, the alternating current impedance $Z_{EL2}$ represented by equation (2) shall be sufficiently larger than the cable loop resistance of intercom system, what's more it does not change depending on the change of DC.

It's obvious to the skilled person in art that the electronic inductance circuit EL2 can use an N-channel FET to construct the similar circuit as the power supply of a 2-wire bus intercom system instead of the P-channel FET.

Figure 7:
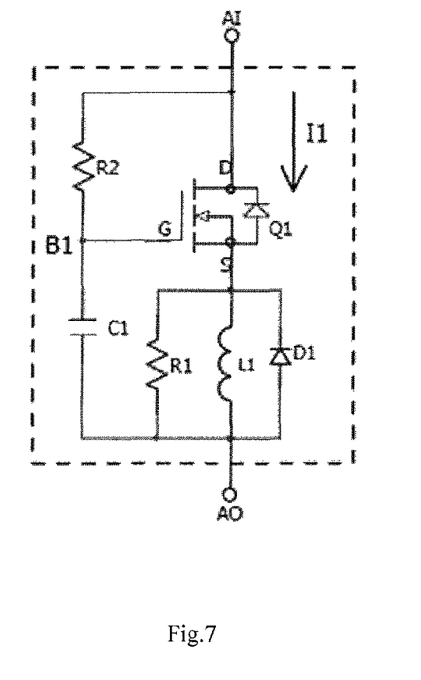
FIG. 7 illustrates a circuit diagram of a kind of the electronic inductance circuit with an N-channel FET for the power supply of a 2-wire bus intercom system according to another embodiment of the present invention.

FIG. 7 illustrates a circuit diagram of a kind of the electronic inductance circuit with an N-channel FET for the power supply of a 2-wire bus intercom system according to another embodiment of the present invention.

As shown in FIG. 7, the components of the electronic inductance circuit is similar to the ones in FIG. 6 except for an N-channel FET Q1; therefore, a main circuit path between the input terminal AI and the output terminal AO of the electronic inductance circuit is along the drain terminal and the source terminal of the N-channel FET Q1 as well as the inductor L1, and the FET Q1 and the inductor L1 are connected in series. Furthermore, the inductor L1 is connected between the source terminal of the FET Q1 and AO terminal, both the resistor R1 and the freewheeling diode D1 are individually connected to the inductor L1 in parallel, the drain terminal of said N-channel FET Q1 is connected to the input terminal AI, and the connection node B1 between the capacitor C1 and the second resistor R2 is connected to the Gate terminal of the N-channel FET Q1. The electronic inductance circuit further comprises a second diode connected to said source terminal and said drain terminal of said FET in parallel.

In summary, the circuit shown in FIG. 7 is symmetrical to the circuit in FIG. 6. With the circuit shown in FIG. 7, the voltage drop and alternating current impedance between the terminals AI and AO are also applicable to be represented by the equations (1) and (2) respectively.

According to another aspect of the present invention, it provides an apparatus which comprises the standby power supply circuit for a 2-wire bus intercom system mentioned above. Furthermore, it also provides an intercom system which comprises an apparatus mentioned above.

Compared with the existing prior arts, the proposed solutions of the present invention comprise a main constant current circuit and an auxiliary constant current circuit, which can achieve larger alternating current impedance for the 2-wire intercom system and offer sufficient power for many device loads both in the conditions of operation and standby statuses.

Though the present invention has been described on the basis of some preferred embodiments, those skilled in the art should appreciate that those embodiments should by no means limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A standby power supply circuit for a 2-wire bus intercom system, wherein said standby power supply circuit is separated into two power supply modules, the standby power supply circuit comprising:
a first power supply module that is a power supply to a standby circuit and a second power supply module that is a power supply to an operation circuit; wherein said power supply to the operation circuit is switched off by a constant current switch when a device load is at a standby status; wherein said power supply to the standby circuit comprises a constant current circuit with an alternating current impedance;
wherein said power supply to the standby circuit further comprises the constant current circuit connected between an input terminal and a standby regulator circuit;
wherein said constant current circuit further comprises a main constant current circuit and an auxiliary constant current circuit, wherein said main constant current circuit stabilizes current through a main constant current path of said main constant current circuit; wherein said auxiliary constant current circuit offers a bias current for the main constant current circuit under a bias voltage while maintaining an AC impedance.

2. The standby power supply circuit according to claim 1, wherein said main constant current circuit further comprises a voltage regulator unit, wherein said voltage regulator unit stabilizes a voltage of said main constant current circuit regardless of temperature or current fluctuations and creates an alternating current impedance of said main current path.

3. The standby power supply circuit according to claim 2, wherein the main constant current path is along a first transistor and a first resistor, wherein a collector of said first transistor is connected to the input terminal and an emitter of said first transistor is connected in series with said first resistor.

4. The standby power supply circuit according to claim 2, wherein said voltage regulator unit further comprises:
a diode and a first Zener diode conversely connected in series, a second resistor and a first capacitor connected in series wherein said diode and said first Zener diode are connected in parallel with said second resistor and said first capacitor.

5. The standby power supply circuit according to claim 4, wherein said standby regulator circuit further comprises a set of resistors consisting of a third resistor and a fourth resistor connected in series, a second Zener diode and a second capacitor wherein said set of resistors, said second Zener diode and said second capacitor are connected in parallel and grounded.

6. The standby power supply circuit according to claim 2, wherein said voltage regulator unit further comprises a first capacitor and a first Zener diode connected in parallel; and said standby regulator circuit further comprises a second Zener diode and a second capacitor connected in parallel and grounded.

7. The standby power supply circuit according to claim 2, wherein said auxiliary constant current circuit comprises a control current path and a second control current path, wherein said control current path is along a second transistor and a fifth resistor, wherein said second control current path is along a third transistor and a sixth resistor, wherein said fifth resistor is connected to a base and an emitter of said third transistor in parallel, wherein said sixth resistor is connected to a collector of said second transistor and a and a base of said second transistor in parallel.

8. The standby power supply circuit according to claim 7, wherein said auxiliary constant current circuit further comprises a third capacitor connected to a collector of said third transistor and an emitter of said third transistor in parallel.

9. The standby power supply circuit according to claim 1, wherein said standby power supply circuit further comprises a microcontroller that switches said constant current switch on and off.

10. An apparatus for a 2-wire bus intercom system, wherein said apparatus comprises the standby power supply circuit according to claim 1.

11. A standby power supply circuit for a 2-wire bus intercom system, wherein said standby power supply circuit is separated into two power supply modules, the standby power supply circuit comprising:
a first power supply module that is a power supply to a standby circuit and a second power supply module that is a power supply to an operation circuit; wherein said power supply to the operation circuit is switched off by a constant current switch when a device load is at a standby status; wherein said power supply to the standby circuit comprises a constant current circuit with an alternating current impedance;
wherein said power supply to operation circuit further comprises an electronic inductance circuit and a second voltage regulator circuit.

12. The standby power supply circuit according to claim 11, wherein said electronic inductance circuit comprises:
a main circuit path along an inductor and a source terminal and a drain terminal of a field-effect transistor (FET) between an input terminal and an output terminal of said electronic inductance circuit, wherein said inductor is connected to said source terminal of said FET;
a resistor and a freewheeling diode individually connected in parallel to said inductor; and
a secondary circuit path along a capacitor connected in series with a second resistor between said input terminal and said output terminal wherein the second circuit path is connected in parallel to said main circuit path.

13. The standby power supply circuit according to claim 12, wherein said inductor and said FET are connected in series, and a node between said capacitor and said second resistor is connected with a gate terminal of said FET.

14. The standby power supply circuit according to claim 12, wherein said FET is a P-channel FET, and said drain terminal of said P-channel FET is connected to said output terminal; and said inductor is connected between said input terminal and said source terminal of said P-channel FET.

15. The standby power supply circuit according to claim 12, wherein said FET is an N-channel FET, and said drain terminal of said N-channel FET is connected to said input terminal; and said inductor is connected between said source terminal of said N-channel FET and said output terminal.

16. An apparatus for a 2-wire bus intercom system, wherein said apparatus comprises the standby power supply circuit according to claim 11.

17. A standby power supply circuit for a 2-wire bus intercom system, wherein said standby power supply circuit is separated into two power supply modules, the standby power supply circuit comprising:
    a first power supply module that is a power supply to a standby circuit and a second power supply module that is a power supply to an operation circuit; wherein said power supply to the operation circuit is switched off by a constant current switch when a device load is at a standby status; wherein said power supply to the standby circuit comprises a constant current circuit with an alternating current impedance;
    wherein said constant current switch is connected between said power supply to the standby circuit and said power supply to the operation circuit, wherein said constant current switch switches off said power supply to the operation circuit when the device load is at the standby status;
    wherein said constant current switch further comprises at least two transistors, three resistors and a fourth capacitor, wherein a seventh resistor is connected to an emitter and a base of a fourth transistor in parallel wherein the base of said fourth transistor is connected to a collector of a fifth transistor, wherein an eighth resistor is connected between an emitter of said fifth transistor and a ground, wherein said fourth capacitor is connected between a base of said fifth transistor and the ground.

18. The standby power supply circuit according to claim 17, wherein a collector of said fourth transistor is connected to an electronic inductance circuit; and a ninth resistor is connected to the base of said fifth transistor and a microcontroller.

19. An apparatus for a 2-wire bus intercom system, wherein said apparatus comprises the standby power supply circuit according to claim 17.

* * * * *